United States Patent
Xiang

(10) Patent No.: US 9,949,300 B2
(45) Date of Patent: Apr. 17, 2018

(54) PACKET TRANSMISSION METHOD AND SYSTEM, AND STATION

(71) Applicant: Huawei Device Co., Ltd., Shenzhen (CN)

(72) Inventor: Chao Xiang, Xi'an (CN)

(73) Assignee: HUAWEI DEVICE CO., LTD., Shenzhen (CN)

( * ) Notice: Subject to any disclaimer, the term of this patent is extended or adjusted under 35 U.S.C. 154(b) by 229 days.

(21) Appl. No.: 14/746,447

(22) Filed: Jun. 22, 2015

(65) Prior Publication Data

US 2015/0289297 A1 Oct. 8, 2015

Related U.S. Application Data

(63) Continuation of application No. PCT/CN2014/080559, filed on Jun. 24, 2014.

(30) Foreign Application Priority Data

Jun. 25, 2013 (CN) .......................... 2013 1 0257019

(51) Int. Cl.
| | |
|---|---|
| *H04W 4/00* | (2009.01) |
| *H04W 76/02* | (2009.01) |
| *H04L 1/16* | (2006.01) |
| *H04L 5/00* | (2006.01) |
| *H04L 12/741* | (2013.01) |
| *H04W 72/04* | (2009.01) |
| *H04W 88/08* | (2009.01) |
| *H04L 1/00* | (2006.01) |

(52) U.S. Cl.
CPC .......... *H04W 76/02* (2013.01); *H04L 1/1614* (2013.01); *H04L 1/1621* (2013.01); *H04L 1/1685* (2013.01); *H04L 5/0055* (2013.01); *H04L 45/74* (2013.01); *H04W 72/04* (2013.01); *H04L 2001/0097* (2013.01); *H04W 88/08* (2013.01)

(58) Field of Classification Search
USPC ................................ 370/328, 229, 230, 252
See application file for complete search history.

(56) References Cited

U.S. PATENT DOCUMENTS

2006/0195753 A1    8/2006  Nam et al.
2006/0248429 A1*  11/2006  Grandhi ............... H04L 1/1664
                                                              714/749

(Continued)

FOREIGN PATENT DOCUMENTS

| CN | 1881920 A | 12/2006 |
|---|---|---|
| CN | 101534517 A | 9/2009 |

(Continued)

*Primary Examiner* — Kwang B Yao
*Assistant Examiner* — Nguyen Ngo
(74) *Attorney, Agent, or Firm* — Slater Matsil, LLP

(57) ABSTRACT

Embodiments of the present invention disclose a packet transmission method and system, and a station, which are used to improve, without increasing cost, data transmission efficiency by optimizing a Wi-Fi packet exchange. The method in the embodiments of the present invention includes: establishing, by a first station, a block acknowledgement connection by negotiating with a second station by using an access point; and if the block acknowledgement connection is successfully established, forwarding, to the second station by using the access point, a data packet sent by the first station.

9 Claims, 4 Drawing Sheets

(56) References Cited

U.S. PATENT DOCUMENTS

| | | | |
|---|---|---|---|
| 2007/0008876 A1* | 1/2007 | Welnick | H04J 13/00 370/208 |
| 2007/0011504 A1* | 1/2007 | Kim | H04L 1/0001 714/704 |
| 2008/0075004 A1* | 3/2008 | Mishima | H04N 21/4305 370/230 |
| 2009/0063804 A1* | 3/2009 | Trainin | H04L 1/1621 711/170 |
| 2009/0116416 A1* | 5/2009 | Sekiya | H04L 1/1614 370/310 |
| 2010/0008247 A1 | 1/2010 | Kwon et al. | |
| 2010/0260042 A1 | 10/2010 | Kwon et al. | |
| 2010/0315999 A1* | 12/2010 | Kakani | H04L 1/1614 370/328 |
| 2011/0026505 A1* | 2/2011 | Trainin | H04L 1/1621 370/338 |
| 2011/0149856 A1* | 6/2011 | Son | H04W 74/008 370/328 |
| 2011/0305176 A1 | 12/2011 | Wentink | |
| 2012/0113879 A1* | 5/2012 | Aoki | H04L 1/1614 370/311 |
| 2013/0077611 A1* | 3/2013 | Shaikh | H04W 76/023 370/338 |
| 2013/0128809 A1 | 5/2013 | Wentink et al. | |
| 2013/0227371 A1* | 8/2013 | Asterjadhi | H04L 1/1614 714/748 |
| 2013/0246584 A1* | 9/2013 | Barton | H04L 67/325 709/219 |
| 2013/0301553 A1* | 11/2013 | Klein | H04W 84/12 370/329 |
| 2014/0307747 A1* | 10/2014 | Yang | H04L 69/04 370/475 |
| 2015/0358067 A1* | 12/2015 | Zhang | H04B 7/15507 370/315 |
| 2016/0142185 A1* | 5/2016 | Merlin | H04L 1/1607 370/312 |

FOREIGN PATENT DOCUMENTS

| | | |
|---|---|---|
| CN | 102025406 A | 4/2011 |
| EP | 2451114 A1 | 5/2012 |
| JP | 2006246027 A | 9/2006 |
| JP | 2011508994 A | 3/2011 |
| JP | 2012100172 A | 5/2012 |
| JP | 2012531175 A | 12/2012 |
| JP | 2013511921 A | 4/2013 |
| JP | 2013511923 A | 4/2013 |
| WO | 2011016951 A2 | 2/2011 |
| WO | 2011063299 A2 | 5/2011 |
| WO | 2011063301 A2 | 5/2011 |
| WO | 2011159831 A1 | 12/2011 |

* cited by examiner

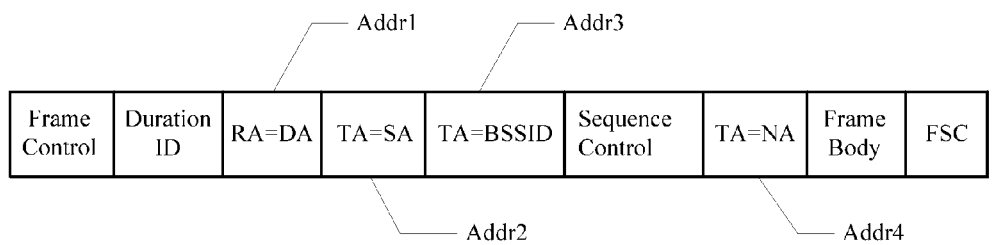
FIG. 3a
FIG. 3b
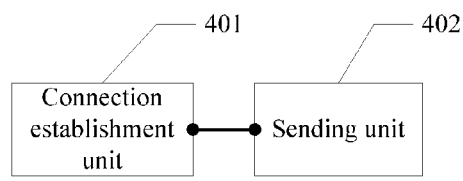
FIG. 4

PACKET TRANSMISSION METHOD AND SYSTEM, AND STATION

This application is a continuation of International Application No. PCT/CN2014/080559, filed on Jun. 24, 2014, which claims priority to Chinese Patent Application No. 201310257019.X, filed on Jun. 25, 2013, both of which are hereby incorporated by reference in their entireties.

TECHNICAL FIELD

The present invention relates to the field of communications technologies, and in particular, to a packet transmission method and system, and a station.

BACKGROUND

With the popularity of mobile wireless fidelity (Wi-Fi) products, users have increasing demands for Wi-Fi access. Performance of a conventional Wi-Fi network has become a major bottleneck affecting user experience. Chip manufacturers improve performance by using different methods, such as increasing a dominant frequency of a central processing unit, increasing cache, or another method. In a Wi-Fi protocol, throughputs of a device and a network are improved by using a block acknowledgement (BA) technology.

In the prior art, the BA technology is limited to be used only between a station (STA) and an access point (AP), where both the STA and the AP can initiate an Add Block Acknowledgement request; after a BA handshake between the STA and the AP succeeds, a sender can continuously send one aggregated data block, and request a receiver to return a block acknowledgement frame; the AP forwards the aggregated data block; the receiver returns block acknowledgement after receiving the data block within one transmission cycle; the AP forwards the block acknowledgement response.

However, in the prior art described above, both an aggregate packet and a BA packet must be forwarded after being parsed and reassembled by the AP, and data processing efficiency is limited by load and a cache size of a CPU on an AP side, which leads to relatively low data processing efficiency.

SUMMARY

Embodiments of the present invention provide a packet transmission method and system, and a station, to improve, without increasing costs, throughput performance of a network and improve data transmission efficiency by optimizing a Wi-Fi packet exchange.

According to a first aspect, the present invention provides a packet transmission method, where the method may include:
establishing, by a first station, a block acknowledgement connection by negotiating with a second station by using an access point; and
if the block acknowledgement connection is successfully established, forwarding, to the second station by using the access point, a data packet sent by the first station.

In a first possible implementation manner of the first aspect, the establishing, by a first station, a block acknowledgement connection by negotiating with a second station by using an access point includes:
sending, by the first station, an Add Block Acknowledgement request packet to the access point, so that the access point forwards the Add Block Acknowledgement request packet to the second station, where the Add Block Acknowledgement request packet is used to request to establish the block acknowledgement connection to the second station; and
receiving an Add Block Acknowledgement response packet that is sent by the second station and forwarded by using the access point.

With reference to the first aspect or the first possible implementation manner of the first aspect, in a second possible implementation manner, the method further includes:
receiving, by the first station, a null data packet regularly sent by the access point, where the null data packet is used to query whether the first station retains a connection to the access point; and
sending connection retention acknowledgement information to the access point.

With reference to the second possible implementation manner of the first aspect, in a third possible implementation manner, the method further includes:
sending, by the first station, a Delete Block Acknowledgement request to the access point if receiving disconnection information of the second station sent by the access point, where the Delete Block Acknowledgement request is used to request to delete the block acknowledgement connection to the second station.

According to a second aspect, the present invention provides a station, where the station may include:
a connection establishment unit, configured to establish a block acknowledgement connection by negotiating with a second station by using an access point; and
a sending unit, configured to: if the connection establishment unit successfully establishes the block acknowledgement connection to the second station, forward, to the second station by using the access point, a data packet sent by the station.

In a first possible implementation manner of the second aspect, the connection establishment unit includes:
an establishment request sending unit, configured to send an Add Block Acknowledgement request packet to the access point, so that the access point forwards the Add Block Acknowledgement request packet to the second station, where the Add Block Acknowledgement request packet is used to request to establish the block acknowledgement connection to the second station; and
an establishment response receiving unit, configured to receive an Add Block Acknowledgement response packet that is sent by the second station and forwarded by using the access point.

With reference to the second aspect or the first possible implementation manner of the second aspect, in a second possible implementation manner, the station further includes:
a receiving unit, configured to receive a null data packet regularly sent by the access point, where the null data packet is used to query whether the station retains a connection to the access point, and
the sending unit is further configured to send connection retention acknowledgement information to the access point.

With reference to the second possible implementation manner of the second aspect, in a third possible implementation manner, the sending unit is further configured to send a Delete Block Acknowledgement request to the access point if disconnection information of the second station sent by the access point is received, where the Delete Block Acknowledgement request is used to request to delete the block acknowledgement connection to the second station.

With reference to the third possible implementation manner of the second aspect, in a fourth possible implementation manner, the station further includes:

a setting unit, configured to set both frame fields that correspond to a To Distributed System domain and a From Distributed System domain and that are in a data packet header to 0, set a destination address in a Media Access Control address domain as a Media Access Control address of the second station, set a source address as a Media Access Control address of the first station, and set a forwarding address as a Media Access Control address of the access point.

According to a third aspect, the present invention provides a packet transmission system, where the system may include:

a first station, an access point, and a second station, where the first station is configured to establish a block acknowledgement connection by negotiating with the second station by using the access point; and if the block acknowledgement connection is successfully established, forward, to the second station by using the access point, a data packet sent by the first station;

the access point is configured to: if the block acknowledgement connection is successfully established between the first station and the second station, forward, to the second station, the data packet sent by the first station; and the second station is configured to: if the block acknowledgement connection to the first station is successfully established, receive the data packet that is sent by the first station and forwarded by the access point.

It can be seen from the foregoing technical solutions that, the embodiments of the present invention have the following advantages: a first STA establishes a block acknowledgement connection by negotiating with a second STA by using an AP; and after the connection is successfully established, forwards, to the second STA by using the AP, a data packet sent by the first STA, where the data packet is forwarded without being parsed or reassembled by the AP, thereby improving data processing efficiency and improving throughput performance; and because a processing capability of a central processing unit on a STA side is far greater than that of a central processing unit on an AP side, the data processing efficiency may further be improved, load of the central processing unit on the AP side may be relieved, and power consumption on the AP side may be reduced.

BRIEF DESCRIPTION OF THE DRAWINGS

FIG. 3*a* is a schematic diagram of a frame control format of a Wi-Fi protocol data packet frame according to an embodiment of the present invention;

FIG. 3*b* is a schematic diagram of a frame body format of a Wi-Fi protocol data packet frame according to an embodiment of the present invention;

FIG. 4 is a schematic diagram of an embodiment of a station according to an embodiment of the present invention;

DETAILED DESCRIPTION OF ILLUSTRATIVE EMBODIMENTS

Embodiments of the present invention provide a packet transmission method, where unidirectional block acknowledgement negotiation between an AP and a STA is optimized to be block acknowledgement negotiation that is directly performed between STAs, and an exchange between a data block packet and a block acknowledgement packet is directly performed between the STAs after the negotiation succeeds, so as to improve, without increasing costs, data processing efficiency and improve network throughout performance by optimizing a Wi-Fi packet exchange.

Figure 1:
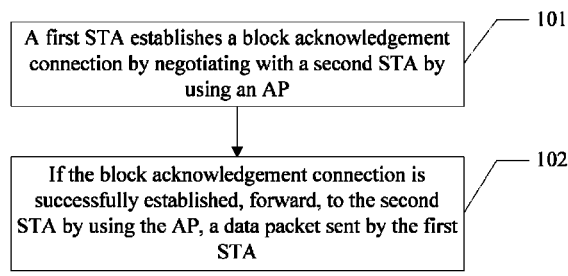
FIG. 1 is a schematic diagram of an embodiment of a packet transmission method according to an embodiment of the present invention.

Referring to FIG. 1, an embodiment of a packet transmission method according to an embodiment of the present invention includes:

101: A first STA establishes a block acknowledgement connection by negotiating with a second STA by using an AP.

Both the first STA and the second STA are stations with a BA negotiation capability. The first STA and the second STA are connected to the AP to access a network. In this embodiment, the first STA and the second STA send an association request packet to the AP during network access, and the AP may determine, according to the association request packet, whether both the first STA and the second STA are capable of BA negotiation.

The first STA establishes the block acknowledgement connection by negotiating with the second STA by using the AP; and if the negotiation succeeds, the first STA establishes the block acknowledgement connection to the second STA.

102: If the block acknowledgement connection is successfully established, forward, to the second STA by using the AP, a data packet sent by the first STA.

If the block acknowledgement connection is successfully established between the first STA and the second STA, the first STA forwards, to the second STA by using the AP, the data packet sent by the first STA. The data packet includes an aggregate packet, a block acknowledgement packet, and another data packet exchanged between the first STA and the second STA.

In this embodiment of the present invention, a first STA establishes a block acknowledgement connection by negotiating with a second STA by using an AP; and after the connection is successfully established, forwards, by using the AP, a data packet sent to the second STA, where the data packet is forwarded without being parsed or reassembled by the AP, thereby improving data processing efficiency in a data transmission process, and improving throughput performance; in addition, because a processing capability of a central processing unit on a STA side is far greater than that of a central processing unit on an AP side, the data processing efficiency may further be improved, load of the central processing unit on the AP side may be relieved, and power consumption on the AP side may be reduced.

Figure 2:
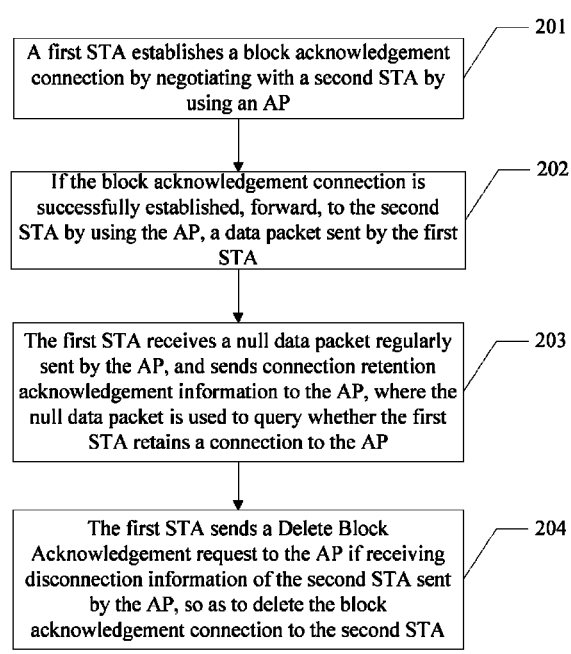
FIG. 2 is a schematic diagram of another embodiment of a packet transmission method according to an embodiment of the present invention.

The following describes a packet transmission method in an embodiment of the present invention in detail by using another embodiment. Referring to FIG. 2, another embodiment of a packet transmission method according to an embodiment of the present invention includes:

201: A first STA establishes a block acknowledgement connection by negotiating with a second STA by using an AP.

Specifically, both the first STA and the second STA are stations with a BA negotiation capability. The first STA and the second STA separately send an association request packet to request for a connection to the AP, so as to implement network access.

In a wireless network protocol, the AP may determine, according to aggregated MAC protocol data unit (A-MPDU) parameter (Parameters) fields in the association request packets Assoc Req of the first STA and the second STA, whether the first STA and the second STA are capable of BA negotiation.

Further, when it is determined that both the first STA and the second STA have a BA negotiation capability, the first STA sends an Add Block Acknowledgement (ADDBA) request packet to the AP, where the Add Block Acknowledgement request packet is forwarded to the second STA by the AP, and used to request to establish the block acknowledgement connection to the second STA; and receives an ADDBA response packet that is sent by the second STA and forwarded by using the AP, where the ADDBA response packet is used to confirm that the block acknowledgement connection to the first STA is established. Then, a BA connection is established between the first STA and the second STA.

202: If the block acknowledgement connection is successfully established, forward, to the second STA by using the AP, a data packet sent by the first STA.

If the block acknowledgement connection is successfully established between the first STA and the second STA, the first STA sends the AP the data packet to be sent to the second STA, and the AP forwards the data packet to the second STA, that is, the AP does not perform parsing, checking, and reassembling on the data packet, but forwards the data packet without change. The data packet includes an aggregate packet, a block acknowledgement packet, and another data packet exchanged between the first STA and the second STA.

That the data packet is forwarded between the first STA and the second STA by using the AP may be implemented by setting frame fields that correspond to a To Distributed System (To DS) domain, a From Distributed System (From Distributed System, From DS for short) domain, and a Media Access Control (MAC) address domain and that are in a Wi-Fi protocol data packet header, so that the data packet is directly forwarded to the second STA by the first STA by using the AP.

For a specific frame format of the Wi-Fi data packet in this embodiment, reference may be made to FIG. 3, where FIG. 3*a* is a structure of a Wi-Fi frame header control field, that is, a structure of a frame control in FIG. 3*b*. FIG. 3*b* is a frame body structure of the Wi-Fi data packet, and FIG. 3*a* is a part of a frame header in FIG. 3*b*.

Specifically, the frame fields that correspond to the To DS domain and the From DS domain and that are in the data packet header are both set to 0. Addr1, Addr2, and Addr3 address domains are filled with a destination address (DA), a source address (SA), and a basic service set identifier (BSSID), respectively, and an Addr4 address domain is filled with NA (Not Available), which does not involve an address, that is, frame fields obtained after filling are separately: Addr1=DA, Addr2=SA, Addr3=BSSID, and Addr4=NA. DA is the destination address, and is filled as a MAC address of the second STA; SA is the source address, and is filled as a MAC address of the first STA; BSSID is filled as a MAC address of the AP; and NA indicates that no address is involved. After the settings, the data packet sent by the first STA to the second STA can be forwarded to the second STA by using the AP.

203: The first STA receives a null data packet regularly sent by the AP, and sends connection retention acknowledgement information to the AP, where the null data packet is used to query whether the first STA retains a connection to the AP.

After receiving the null data packet regularly sent by the AP, the first STA sends the connection retention acknowledgement information ACK to the AP, which indicates that the first STA is connected to a network normally.

In this embodiment, the AP regularly checks whether the first STA and the second STA have been offline; specifically, checking may be performed by continuously sending the null data (NULL DATA) packet. If neither the first STA nor the second STA returns the acknowledgement information within a specified time, it is considered that the first STA or the second STA has been offline; the AP notifies, by broadcasting, that the first STA or the second STA has been offline.

204: Send a Delete Block Acknowledgement request to the AP if the first STA receives disconnection information of the second STA sent by the AP.

If the first STA receives the disconnection information of the second STA sent by the AP, where the disconnection information is used to indicate that the second STA is disconnected from the AP, that is, the second STA has been offline, the first STA sends the Delete Block Acknowledgement (DELBA) request to the AP, so as to request to delete the block acknowledgement connection to the second STA, that is, the first STA proactively ends aggregation negotiation that is with the second STA and that is based on block acknowledgement, and recovers a normal data exchange with the AP, thereby avoiding affecting data packet transmission due to a block acknowledgement disconnection from the second STA.

It should be noted that the foregoing embodiments describe the packet transmission method by using an example of a scenario in which an AP is connected to two STAs, and the method is also applicable to a scenario in which an AP is connected multiple STAs.

In this embodiment of the present invention, by using an AP to forward an Add Block Acknowledgement request packet and response packet, a first STA and a second STA establish a block acknowledgement connection, where unidirectional block acknowledgement negotiation between an AP and a STA is converted into block acknowledgement negotiation between the two STAs, which speeds up a data processing rate; frame fields that correspond to a To DS domain, a From DS domain, and a MAC address domain and that are in a data packet header are set, so that a data packet is forwarded to the second STA by the first STA by using the AP, where the data packet is forwarded without being parsed or reassembled by the AP, thereby improving data processing efficiency and improving throughput performance of a Wi-Fi network; because a processing capability of a central processing unit on a STA side is far greater than that of a central processing unit on an AP side, the data processing efficiency may further be improved, load of the central processing unit on the AP side may be relieved, and power consumption on the AP side may be reduced; in addition, a null data packet regularly sent by the AP is received, and connection retention acknowledgement information is sent to the AP, so as to maintain normal transmission of the data packet.

The following describes a station in an embodiment of the present invention. Referring to FIG. 4, an embodiment of a station according to an embodiment of the present invention includes:

a connection establishment unit 401, configured to establish a block acknowledgement connection by negotiating with a second STA by using an AP; and a sending unit 402, configured to: if the connection establishment unit 401 successfully establishes the block acknowledgement connection to the second STA, forward, to the second STA by using the AP, a data packet sent by the STA.

For specific processes of implementing functions by functional units of the station in this embodiment of the present invention, reference may be made to the descriptions in the foregoing embodiment shown in FIG. 1, and details are not described herein again.

In this embodiment of the present invention, a connection establishment unit 401 of the STA establishes a block acknowledgement connection by negotiating with a second STA by using an AP; after the connection is successfully established, a sending unit 402 forwards, by using the AP, a data packet sent to the second STA, where the data packet is forwarded without being parsed or reassembled by the AP, thereby improving data processing efficiency in a transmission process, and improving throughput performance of a Wi-Fi network; in addition, because a processing capability of a central processing unit on a STA side is far greater than that of a central processing unit on an AP side, the data processing efficiency may further be improved, load of the central processing unit on the AP side may be relieved, and power consumption of the AP may be reduced.

Figure 5:
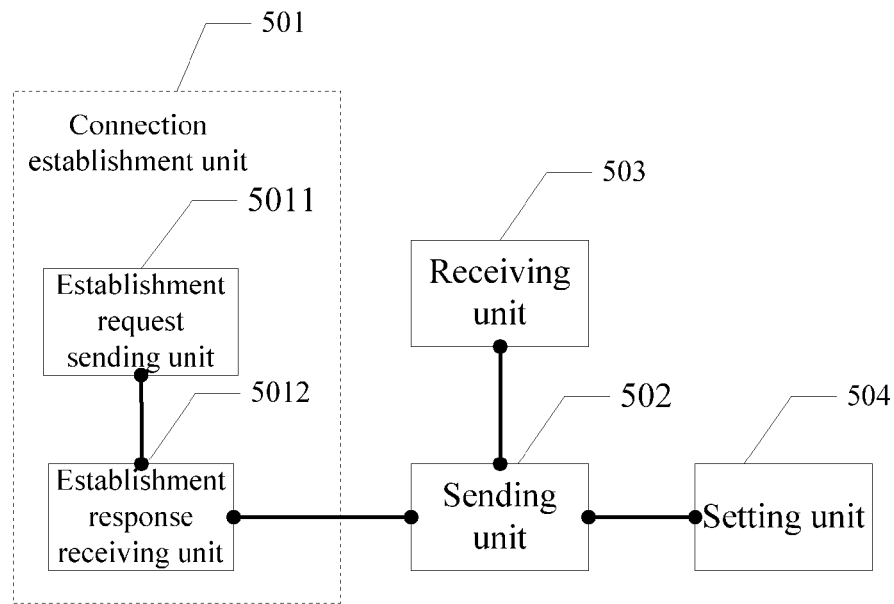
FIG. 5 is a schematic diagram of another embodiment of a station according to an embodiment of the present invention.

For ease of understanding, referring to FIG. 5, another more detailed embodiment of a station according to an embodiment of the present invention includes:

a connection establishment unit 501, configured to establish a block acknowledgement connection by negotiating with a second STA by using an AP; and a sending unit 502, configured to: if the connection establishment unit 501 successfully establishes the block acknowledgement connection to the second STA, forward, to the second STA by using the AP, a data packet sent by the STA.

The connection establishment unit 501 further includes:

an establishment request sending unit 5011, configured to send an Add Block Acknowledgement request packet to the AP, so that the AP forwards the Add Block Acknowledgement request packet to the second STA, where the Add Block Acknowledgement request packet is used to request to establish the block acknowledgement connection to the second STA; and an establishment response receiving unit 5012, configured to receive an Add Block Acknowledgement response packet that is sent by the second STA and forwarded by using the AP.

Further, the station in this embodiment of the present invention further includes:

a receiving unit 503, configured to receive a null data packet regularly sent by the AP, where the null data packet is used to query whether the STA retains a connection to the AP.

The sending unit 502 is further configured to send connection retention acknowledgement information to the AP.

The sending unit 502 is further configured to send a Delete Block Acknowledgement request to the AP if disconnection information of the second STA sent by the AP is received, where the Delete Block Acknowledgement request is used to request to delete the block acknowledgement connection to the second STA.

Further, the station in this embodiment of the present invention may further include:

a setting unit 504, configured to set both frame fields that correspond to a To Distributed System domain and a From Distributed System domain and that are in a data packet header to 0, set a destination address in a Media Access Control address domain as a Media Access Control address of the second station, set a source address as a Media Access Control address of the first station, and set a forwarding address as a Media Access Control address of the access point.

For specific processes of implementing functions by functional units of the station in this embodiment of the present invention, reference may be made to the descriptions in the foregoing embodiments shown in FIG. 1 and FIG. 2, and details are not described herein again.

In this embodiment of the present invention, by using an AP to forward an Add Block Acknowledgement request packet and response packet, an establishment request sending unit 5011 and an establishment response receiving unit 5012 establish a block acknowledgement connection, where unidirectional block acknowledgement negotiation between an AP and a STA is converted into block acknowledgement negotiation between two STAs, which speeds up a data processing rate; a setting unit 504 sets frame fields that correspond to a To DS domain, a From DS domain, and a MAC address domain and that are in the data packet header, so that the data packet is directly sent to the second STA by the STA by using the AP, where the data packet is forwarded without being parsed or reassembled by the AP, thereby improving data processing efficiency and improving throughput performance; because a processing capability of a central processing unit on a STA side is far greater than that of a central processing unit on an AP side, the data processing efficiency may further be improved, load of the central processing unit on the AP side may be relieved, and power consumption of the AP may be reduced; in addition, a receiving unit 503 receives a null data packet regularly sent by the AP, and sends connection retention acknowledgement information to the AP, so as to maintain normal transmission of the data packet; a sending unit 502 sends a Delete Block Acknowledgement request to the AP if disconnection information of the second STA sent by the AP is received, where the Delete Block Acknowledgement request is used to request to delete the block acknowledgement connection to the second STA, that is, to proactively end negotiation that is with the second STA and that is based on block acknowledgement, and recover a normal data exchange with the AP, thereby avoiding affecting data packet transmission due to a block acknowledgement disconnection from the second STA.

Figure 6:
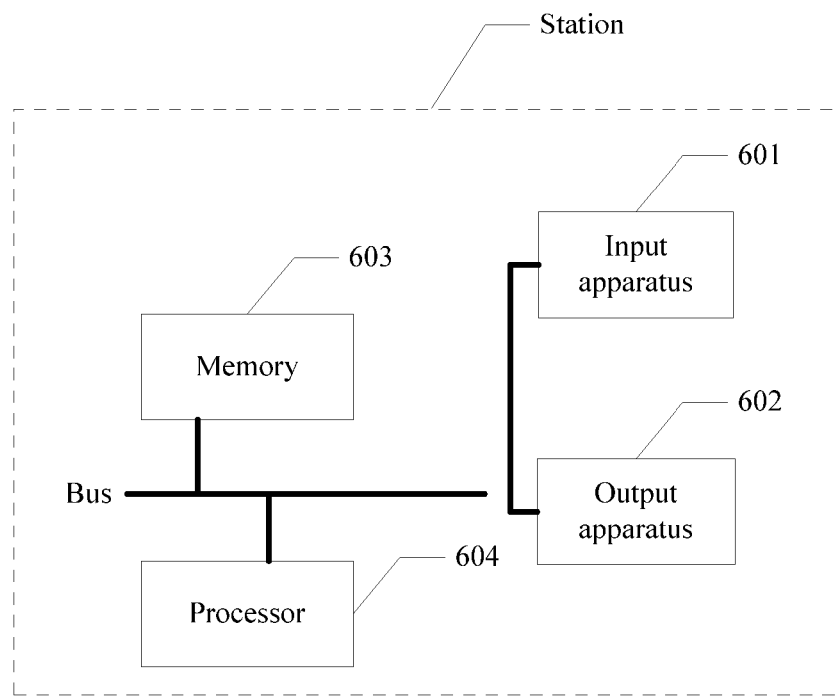
FIG. 6 is a schematic diagram of still another embodiment of a station according to an embodiment of the present invention.

An embodiment of the present invention further provides a station. Referring to FIG. 6, the station includes:

an input apparatus 601, an output apparatus 602, a memory 603, and a processor 604.

There may be one or more processors 604 in the station. In FIG. 6, one processor is used as an example. In this embodiment of the present invention, the input apparatus 601, the output apparatus 602, the memory 603, and the processor 604 may be connected by using a bus or in another manner. Connection by using a bus is used as an example in FIG. 6.

The processor 604 executes the following step:

establishing a block acknowledgement connection by negotiating with a second station by using an access point.

The output apparatus 602 executes the following step:

if the block acknowledgement connection is successfully established, forwarding, to the second station by using the access point, a data packet sent by the station.

For specific processes of implementing functions by functional units of the station in this embodiment of the present invention, reference may be made to the descriptions of the packet transmission method in the foregoing embodiments shown in FIG. 1 and FIG. 2, and details are not described herein again.

Figure 7:
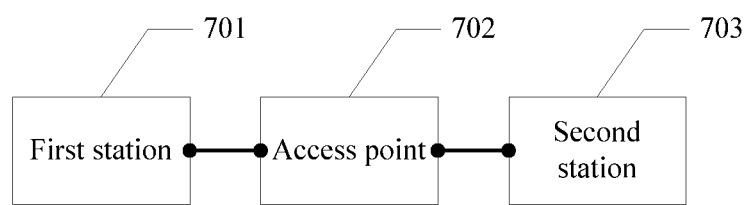
FIG. 7 is a schematic diagram of an embodiment of a packet transmission system according to an embodiment of the present invention.

The following describes a packet transmission system in an embodiment of the present invention. Referring to FIG. 7, a packet transmission system in an embodiment of the present invention includes:

a first station 701, an access point 702, and a second station 703.

The first station 701 is configured to establish a block acknowledgement connection by negotiating with the second station 703 by using the access point 702; and if the block acknowledgement connection is successfully established, forward, to the second station 703 by using the access point 702, a data packet sent by the first station 701.

The access point 702 is configured to: if the block acknowledgement connection is successfully established between the first station 701 and the second station 703, forward, to the second station 703, the data packet sent by the first station 701.

The second station 703 is configured to: if the block acknowledgement connection to the first station 701 is successfully established, receive the data packet that is sent by the first station 701 and forwarded by the access point 702.

For specific processes of implementing functions by apparatuses in the packet transmission system in this embodiment of the present invention, reference may be made to the related descriptions of the packet transmission method in the foregoing embodiments shown in FIG. 1 and FIG. 2, and details are not described herein again.

A person of skill in the art may understand that all or a part of the steps of the methods in the embodiments may be implemented by a program instructing relevant hardware. The program may be stored in a computer readable storage medium. The storage medium may include: a read-only memory, a magnetic disk, or an optical disc.

The foregoing describes in detail the packet transmission method and system, and the station provided in the present invention. With respect to the specific implementation manners and the application scope, modifications may be made by a person of ordinary skill in the art according to the idea of the embodiments of the present invention. Therefore, this specification shall not be construed as a limitation on the present invention.

What is claimed is:

1. A packet transmission method, comprising:
    establishing, by a first station, a block acknowledgement connection by negotiating with a second station by using an access point;
    setting frame fields that correspond to a To Distributed System domain and a From Distributed System domain and that are in a data packet header of a data packet sent by the station to zero;
    setting a destination address in a Media Access Control address domain as a Media Access Control address of the second station;
    setting a source address as a Media Access Control address of the station;
    setting a forwarding address as a Media Access Control address of the access point; and
    forwarding, to the second station by using the access point and in response to the block acknowledgement connection being successfully established, the data packet sent by the first station, wherein the access point is identified by a first address in a frame body structure of the data packet, and wherein the second station is identified by a second address in the frame body structure.

2. The method according to claim 1, wherein the establishing, by a first station, a block acknowledgement connection by negotiating with a second station by using an access point comprises:
    sending, by the first station, an Add Block Acknowledgement request packet to the access point, so that the access point forwards the Add Block Acknowledgement request packet to the second station, wherein the Add Block Acknowledgement request packet is used to request to establish the block acknowledgement connection to the second station; and
    receiving an Add Block Acknowledgement response packet that is sent by the second station and forwarded by using the access point.

3. The method according to claim 1, wherein the method further comprises:
    receiving, by the first station, a null data packet regularly sent by the access point, wherein the null data packet is used to query whether the first station retains a connection to the access point; and
    sending connection retention acknowledgement information to the access point.

4. The method according to claim 1, wherein the method further comprises:
    sending, by the first station, a Delete Block Acknowledgement request to the access point in response to receiving disconnection information of the second station sent by the access point, wherein the Delete Block Acknowledgement request is used to request to delete the block acknowledgement connection to the second station.

5. A station, comprising:
    a processor;
    a non-transitory computer readable medium connected to the processor and having stored thereon instructions, that when executed, cause the processor to:
        establish a block acknowledgement connection by negotiating with a second station by using an access point;
        set frame fields that correspond to a To Distributed System domain and a From Distributed System domain and that are in a data packet header of a data packet sent by the station to zero;
        set a destination address in a Media Access Control address domain as a Media Access Control address of the second station;
        set a source address as a Media Access Control address of the station; and
        set a forwarding address as a Media Access Control address of the access point; and
    a transmitter configured to forward, to the second station by using the access point and in response to successfully establishing the block acknowledgement connection to the second station, the data packet sent by the station, wherein the access point is identified by a first address in a frame body structure of the data packet, and wherein the second station is identified by a second address in the frame body structure.

6. The station according to claim 5, wherein the instructions causing the processor to establish a block acknowledgement connection comprise instructions, that when executed, cause the processor to:
send an Add Block Acknowledgement request packet to the access point, so that the access point forwards the Add Block Acknowledgement request packet to the second station, wherein the Add Block Acknowledgement request packet is used to request to establish the block acknowledgement connection to the second station; and
receive an Add Block Acknowledgement response packet that is sent by the second station and forwarded by using the access point.

7. The station according to claim 5, wherein the station further comprises:
a receiver configured to receive a null data packet regularly sent by the access point, wherein the null data packet is used to query whether the station retains a connection to the access point;
wherein the transmitter is further configured to send connection retention acknowledgement information to the access point.

8. The station according to claim 5, wherein
the transmitter is further configured to send a Delete Block Acknowledgement request to the access point if disconnection information of the second station sent by the access point is received, wherein the Delete Block Acknowledgement request is used to request to delete the block acknowledgement connection to the second station.

9. A packet transmission system, comprising:
a first station;
an access point; and
a second station;
wherein the first station is configured to establish a block acknowledgement connection by negotiating with the second station by using the access point;
wherein the first station is further configured to set frame fields that correspond to a To Distributed System domain and a From Distributed System domain and that are in a data packet header of a data packet sent by the station to zero, set a destination address in a Media Access Control address domain as a Media Access Control address of the second station, set a source address as a Media Access Control address of the station, and set a forwarding address as a Media Access Control address of the access point;
wherein the first station is further configured to forward, to the second station by using the access point and in response to the block acknowledgement connection being successfully established, the data packet sent by the first station, wherein the access point is identified by a first address in a frame body structure of the data packet, and wherein the second station is identified by a second address in the frame body structure;
wherein the access point is configured to forward, to the second station, in response to the block acknowledgement connection being successfully established between the first station and the second station, the data packet sent by the first station; and
wherein the second station is configured to receive, in response to the block acknowledgement connection to the first station being successfully established, the data packet that is sent by the first station and forwarded by the access point.

* * * * *